United States Patent
Pytlik et al.

(10) Patent No.: US 9,653,930 B2
(45) Date of Patent: May 16, 2017

(54) EMERGENCY SYSTEM FOR POWER FAILURES

(75) Inventors: Edward Pytlik, Ellwangen (DE); Rainer Hald, Ellwangen (DE)

(73) Assignee: VARTA Microbattery GmbH (DE)

( * ) Notice: Subject to any disclaimer, the term of this patent is extended or adjusted under 35 U.S.C. 154(b) by 521 days.

(21) Appl. No.: 14/123,546

(22) PCT Filed: May 23, 2012

(86) PCT No.: PCT/EP2012/059646
§ 371 (c)(1),
(2), (4) Date: Dec. 3, 2013

(87) PCT Pub. No.: WO2012/168080
PCT Pub. Date: Dec. 13, 2012

(65) Prior Publication Data
US 2014/0103882 A1    Apr. 17, 2014

(30) Foreign Application Priority Data
Jun. 7, 2011    (DE) .................. 10 2011 077 073

(51) Int. Cl.
*H02J 7/00* (2006.01)
(52) U.S. Cl.
CPC .......... *H02J 7/0029* (2013.01); *H02J 7/0091* (2013.01)
(58) Field of Classification Search
CPC ............................ H02J 7/0029; H02J 7/0091
USPC .............................. 320/132, 134, 150, 152
See application file for complete search history.

(56) References Cited

U.S. PATENT DOCUMENTS

| | | | |
|---|---|---|---|
| 3,668,418 A | 6/1972 | Godard | |
| 4,709,202 A * | 11/1987 | Koenck | G06F 1/263 320/112 |
| 5,602,462 A | 2/1997 | Stich et al. | |
| 5,623,195 A | 4/1997 | Bullock et al. | |
| 6,312,848 B1 | 11/2001 | Kilb et al. | |
| 2006/0113964 A1 | 6/2006 | Ito et al. | |
| 2008/0030171 A1* | 2/2008 | Villefrance | H01M 10/443 320/150 |
| 2009/0015202 A1 | 1/2009 | Miura | |
| 2009/0015209 A1 | 1/2009 | Morina et al. | |
| 2009/0085527 A1 | 4/2009 | Odaohhara | |
| 2011/0086253 A1 | 4/2011 | Pompetzki et al. | |

(Continued)

FOREIGN PATENT DOCUMENTS

| | | |
|---|---|---|
| CN | 1115048 | 1/1996 |
| DE | 20 2004 017 545 U1 | 3/2005 |
| DE | 10 2008 020 912 A1 | 10/2009 |

(Continued)

*Primary Examiner* — Edward Tso
*Assistant Examiner* — Aaron Piggush
(74) *Attorney, Agent, or Firm* — DLA Piper LLP (US)

(57) ABSTRACT

An emergency system for power failures includes a single-cell or multiple-cell rechargeable battery selected from the group consisting of NiMH, NiCd, NiZn, $Ag_2O/Zn$ or lithium-ion, and a charging electronics system that charges the battery, wherein the charging electronics system provides a charging voltage at which the battery does not overcharge at a temperature of up to 80° C., and wherein the charging electronics system supplies a charging voltage at which the battery is transferred into a charging state and/or is kept in a charging state, in which the battery is charged to 5% to 30%.

13 Claims, 4 Drawing Sheets

(56) References Cited

U.S. PATENT DOCUMENTS

2011/0208267 A1* 8/2011 Eder .................. A61N 1/36032
 607/57

FOREIGN PATENT DOCUMENTS

| EP | 1 011 163 A1 | 6/2000 |
| EP | 1 885 014 A2 | 2/2008 |
| WO | 2011/053951 A1 | 5/2011 |

* cited by examiner

EMERGENCY SYSTEM FOR POWER FAILURES

TECHNICAL FIELD

This disclosure relates to an emergency system for power failures, which system can, in particular, safeguard operation of a data-processing device.

BACKGROUND

Emergency systems for power failures are known from many fields of engineering. In particular, in the field of data-processing, it is necessary to prevent data losses due to uncontrolled disconnections of data-processing devices as a result of power failures and current interruptions. Suitable emergency systems should in these cases temporarily take over the supply of power to at least the most important components of data-processing devices to enable a proper shutdown.

The safeguarding of volatile memories of data-processing devices both with rechargeable batteries and with capacitors is known. A rechargeable nickel-metal hydride battery which is basically suitable for applications of this type is described, for example, in EP 1 011 163 B1. Suitable capacitors are, in particular, so-called "double-layer" capacitors (supercapacitors). The use of the latter as energy source for an emergency system for power failures is described, for example, in DE 20 2004 017 545 U1.

Double-layer capacitors have the great advantage that they can very rapidly supply very high pulsed currents. However, the capacity of those capacitors is limited according to the nature of a capacitor. Furthermore, like all capacitors, they have a falling voltage characteristic.

Rechargeable batteries such as those described, for example, in EP 1 011 163 B1 offer a significantly higher capacity. However, these have the disadvantage that they can be overcharged at the relatively high temperatures that can occur in data-processing devices during operation, which can lead to a drastic reduction in their life expectancy.

There is, therefore, a need to provide an emergency system for power failures which does not have the above disadvantages.

SUMMARY

We provide an emergency system for power failures including a single-cell or multiple-cell rechargeable battery selected from the group consisting of NiMH, NiCd, NiZn, Ag$_2$O/Zn or lithium-ion, and a charging electronics system that charges the battery, wherein the charging electronics system provides a charging voltage at which the battery does not overcharge at a temperature of up to 80° C., and wherein the charging electronics system supplies a charging voltage at which the battery is transferred into a charging state and/or is kept in a charging state, in which the battery is charged to 5% to 30%.

We also provide an emergency system for power failures including a single-cell or multiple-cell rechargeable battery selected from the group consisting of NiMh, NiCd, NiZn, Ag$_2$O/Zn or lithium-ion, and a charging electronics system that charges the battery, wherein the charging electronics system provides a charging voltage at which the battery does not overcharge at a temperature of up to 80° C.

We further provide a printed circuit board for a data-processing device including the emergency system for power failures including a single-cell or multiple-cell rechargeable battery selected from the group consisting of NiMH, NiCd, NiZn, Ag2O/Zn or lithium-ion, and a charging electronics system that charges the battery, wherein the charging electronics system provides a charging voltage at which the battery does not overcharge at a temperature of up to 80° C., and wherein the charging electronics system supplies a charging voltage at which the battery is transferred into a charging state and/or is kept in a charging state, in which the battery is charged to 5% to 30%.

We further still provide a printed circuit board for a data-processing device including the emergency system for power failures including a single-cell or multiple-cell rechargeable battery selected from the group consisting of NiMh, NiCd, NiZn, Ag2O/Zn or lithium-ion, and a charging electronics system that charges the battery, wherein the charging electronics system provides a charging voltage at which the battery does not overcharge at a temperature of up to 80° C.

We further yet provide a method of operating a data-processing device which has an emergency system including a single-cell or multiple-cell rechargeable battery selected from the group consisting of NiMh, NiCd, NiZn, Ag2O/Zn or lithium-ion, and a charging electronics system that charges the battery, including keeping the battery in a charging state by the charging electronics system in which charging state the battery does not overcharge at a temperature of up to 80° C.

DETAILED DESCRIPTION

Figure 1:
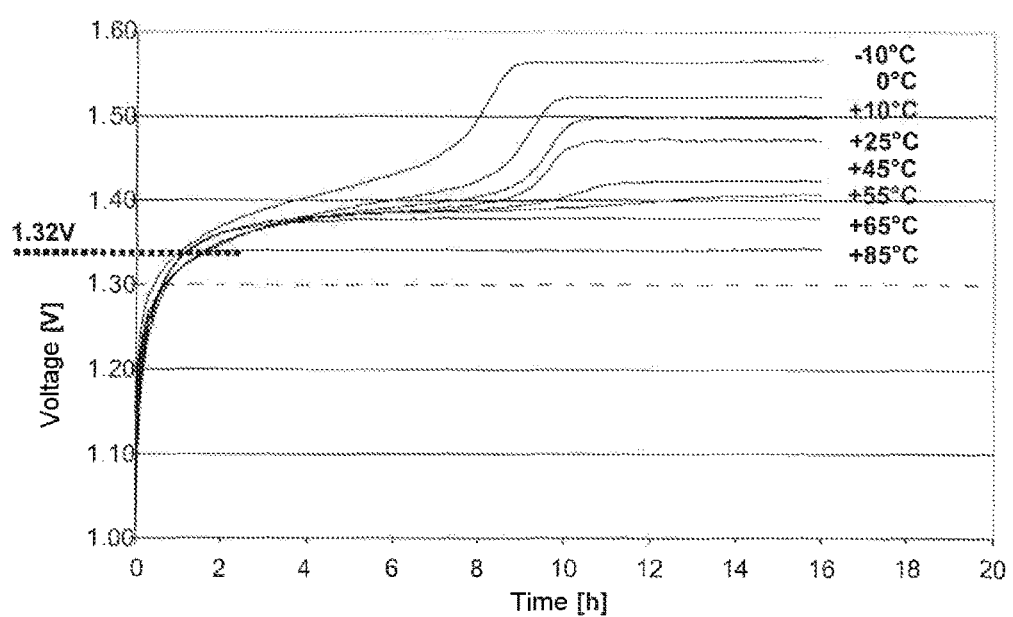
FIG. 1 is a graph of charging characteristics of a single-cell nickel-metal hydride battery at selected temperatures.

We provide an emergency system for power failures comprising a single-cell or multiple-cell rechargeable battery and a charging electronics system for charging the battery.

The emergency system comprises a single-cell or multiple-cell rechargeable battery and a charging electronics system for charging the battery, which can be arranged together on a printed circuit board of a data-processing device.

The battery can be, in particular, an NiMH battery (nickel-metal hydride), an NiCd battery (nickel-cadmium), NiZn battery (nickel-zinc), Ag$_2$O/Zn battery (silver oxide-zinc) or a lithium-ion battery. All of these electrochemical systems are possible in principle. Particularly preferably, however, the battery is a battery with an aqueous, alkaline electrolyte. Accordingly, batteries based on NiCd, NiMH and NiZn are particularly preferred.

In contrast to known emergency systems, our emergency systems are distinguished in particular in that the charging electronics system provides a charging voltage at which the battery does not overcharge, even at a temperature of up to 80° C., preferably even of up to 85° C.

Particularly preferably, the charging electronics system is designed such that it provides a charging voltage at which the battery is transferred into a charging state and/or is kept in a charging state, in which the battery is charged to a value of 1% to 30%, preferably 5% to 25%, in particular 10% to 20%, of its nominal capacity (at 20±2° C.).

The voltage profile of batteries during charging and discharging processes is, in principle, very heavily dependent on the temperature. For example, at low temperatures (for example, 0 to 20° C.), relatively high voltages are needed to completely charge a battery of the type mentioned above. At high temperatures (for example, 60 to 80° C.), a battery can very quickly overcharge at the same voltages (and otherwise identical charging parameters).

The voltage limit below which a battery does not overcharge at a given temperature must be determined in principle depending on the system. However, in principle, it always applies that, at a charging voltage at which a battery is transferred into the abovementioned charging states (charged to 5% to 30% of the nominal capacity thereof), no overcharging occurs at the mentioned temperatures either.

Batteries in the specified charging state are particularly well suited as a power supply unit for emergency systems for power failures since they are able to output a plurality of very high pulsed currents in quick succession. Due to the low charging state thereof, they can never be overcharged at the temperatures which usually prevail in data-processing devices. As a result, they have a nearly unlimited service life under the conditions mentioned.

Despite the very low charging state, seen in absolute terms, the amount of current available in the battery considerably exceeds that of a double-current capacitor of identical volume. Generally, pulsed currents with up to approximately 5 to 10 times the pulse length can straightforwardly be retrieved.

The charging voltages at which a battery does not overcharge at the temperatures mentioned can easily be determined by those skilled in the art. Preferably, the following applies:

an NiMH battery is selected as a battery for the emergency system and the charging voltage per cell of the battery is 1.325 V±5 mV,
an NiCd battery is selected as the battery and the charging voltage per cell of the battery is 1.335 V±5 mV,
an NiZn battery is selected as the battery and the charging voltage per cell of the battery is 1.90 V±50 mV,
an $Ag_2O/Zn$ battery is selected as the battery and the charging voltage per cell of the battery is 1.605 V±5 mV, or
a lithium-ion battery is selected as the battery and the charging voltage per cell of the battery is 1.875 V±25 mV (for $LiCoO_2$ as active material).

Preferably, the charging voltage supplied by the charging electronics system is constant, that is to say it does not change during charging (constant-voltage charging process). As the charging-up process progresses, the charging current decreases due to the decreasing voltage difference between the voltage supplied by the charging electronics system and that of the battery. Once the voltages have equalized, only a residual current still flows to compensate for the self-discharge of the battery. Therefore, the battery is first transferred into a defined charging state and then held in the same. This process is repeated after every power failure during which the emergency system.

It is known how charging electronics systems which have the characteristics required here are constructed. Thus, for example, the charging voltage can be adjusted to the required values by suitable resistors.

As already mentioned above, the battery of our emergency system can, in principle, be a single-cell or multiple-cell battery. In the case of a multiple-cell battery, it is preferable that the individual cells of the battery connect in series with one another. In this case, the abovementioned voltage values also only relate to one cell in each case. If, for example, a nickel-metal hydride battery with two nickel-metal hydride cells connected in series with one another is used, then the charging voltage is preferably 2.65±10 mV.

If the individual cells of the battery are connected in parallel with one another, the abovementioned voltage values relate to the battery as a whole. If, for example, a nickel-metal hydride battery with two nickel-metal hydride cells connected in parallel with one another is used, then the charging voltage is preferably 1.325±5 mV.

The accumulators described in EP 1 011 163 B1, which has already been mentioned multiple times, can be used very well as batteries for our emergency system. The full contents of EP 1 011 163 B1 are hereby incorporated by reference.

Particularly preferably, the battery and the charging circuit are arranged in a common housing, wherein electrical contacts are provided for the charging circuit to make contact with an external voltage source and for the battery of the emergency system to make contact with a device on the housing which is to be supplied with emergency power.

Our emergency systems configured in this way can readily be applied to conventional printed circuit boards for data-processing devices. Printed circuit boards of this type are also a subject of this disclosure.

Data-processing devices to be protected are, in particular, those in a network environment, that is to say server systems in which the aspect of data security is very important. Of course, however, in principle, our emergency system and our printed circuit board can also be built into single workstations and into mobile terminal devices such as notebooks without any problems.

We also provide a method for operating data-processing devices such as the abovementioned servers. In accordance with the above explanations concerning the emergency system, a data-processing device which has a single-cell or multiple-cell rechargeable battery and a charging electronics system for charging the battery as such is operated according to our methods such that the battery is kept in a charging state by the (suitably configured) charging electronics system, in which charging state the battery does not overcharge, even at a temperature of up to 80° C., preferably of up to 85° C.

Particularly preferably, the charging electronics system in this case keeps the battery in a charging state as has already been defined above.

Of course, the basic concept of operating a battery with parameters in the case of which the battery cannot overcharge, but at the same time has electrical properties identical to those of a double-layer capacitor is not only of interest in the field of emergency systems for power failures. Rather, our methods and systems can offer solutions in all technical fields in which double-layer capacitors are used. Correspondingly, the use of a combination of a single-cell or multiple-cell rechargeable battery as was described above and a charging electronics system operated with the parameters defined above as electronic component with the characteristics of a double-layer capacitor is also a subject of this disclosure.

The emergency system and the further subjects are explained in more detail on the basis of the figures which are described below. At this juncture, it should explicitly be emphasized that all of the optional aspects of the emergency system or the other subjects described herein can each be implemented alone or in combination with one or more of the further described optional aspects in an example. The following description serves merely by way of explanation and for better understanding and is in no way to be understood as restrictive.

FIG. 1 shows the charging characteristics of a single-cell nickel-metal hydride battery at various temperatures.

The charging characteristics of the battery are shown at −10° C., 0° C., +10° C., +25° C., +45° C., +55° C., +65° C. and +85° C. It can be seen that the voltage of a battery at a temperature of +85° C. does not exceed a value of 1.32 V during charging. To fully charge a battery at a temperature of, for example, 25° C., substantially higher voltages are needed. Conversely, however, charging a nickel-metal hydride battery at these voltages would inevitably lead to the battery being overcharged if it heats up to 85° C.

The charging voltage is selected such that no overcharging can take place, even at 85° C. Once the battery has the stated voltage, the charging process can be ended. As can clearly be seen in FIG. 1, the state is reached in, in some cases significantly, under two hours at all temperatures. The charging state of the battery is then generally between 5% and 30% of its nominal capacity (at 20±2° C.). The residual current established in this case only compensates the self-discharge and can (almost) be maintained for an arbitrary length of time.

Figure 2A:
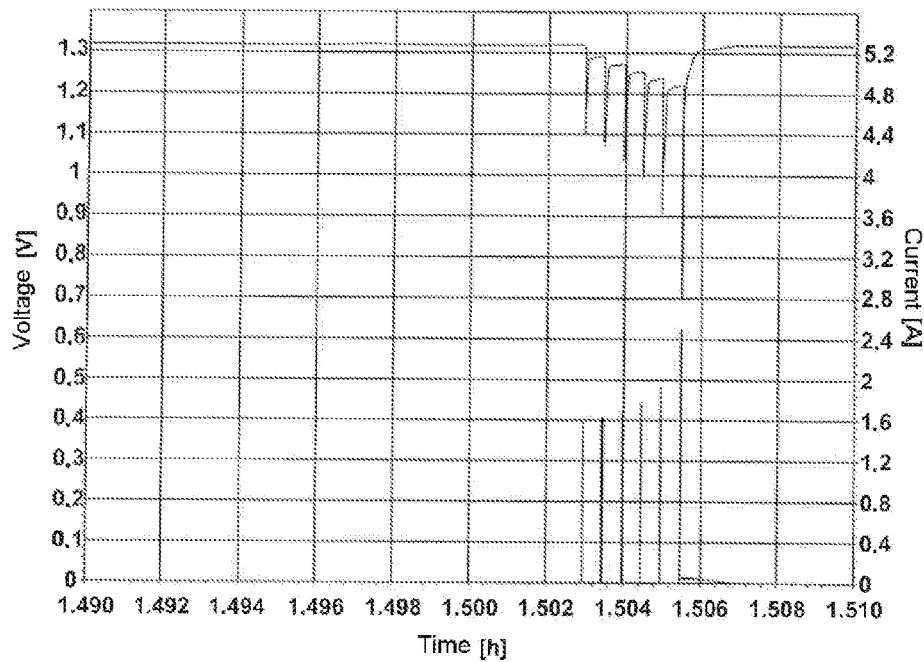
FIGS. 2A-2E are a series of graphs of loading capacity of batteries kept at a voltage of 1.32 V at selected temperatures.
Figure 2B:
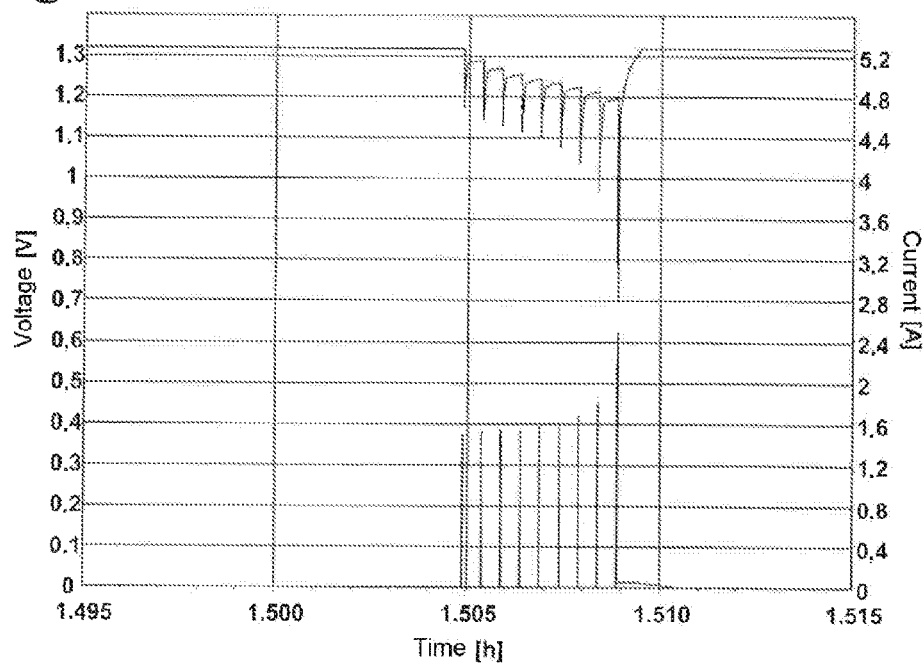
Figure 2C:
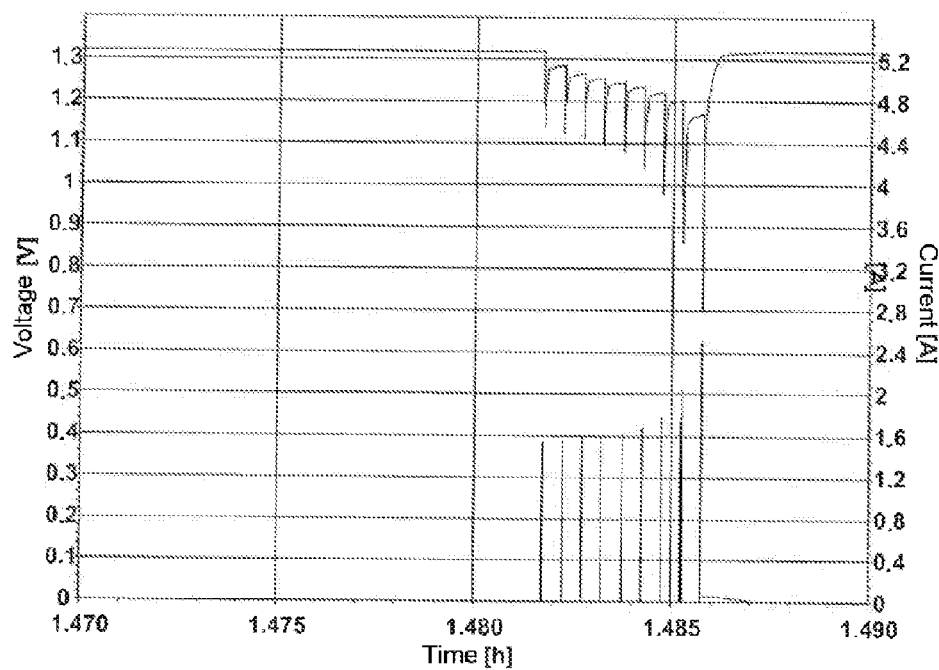
Figure 2D:
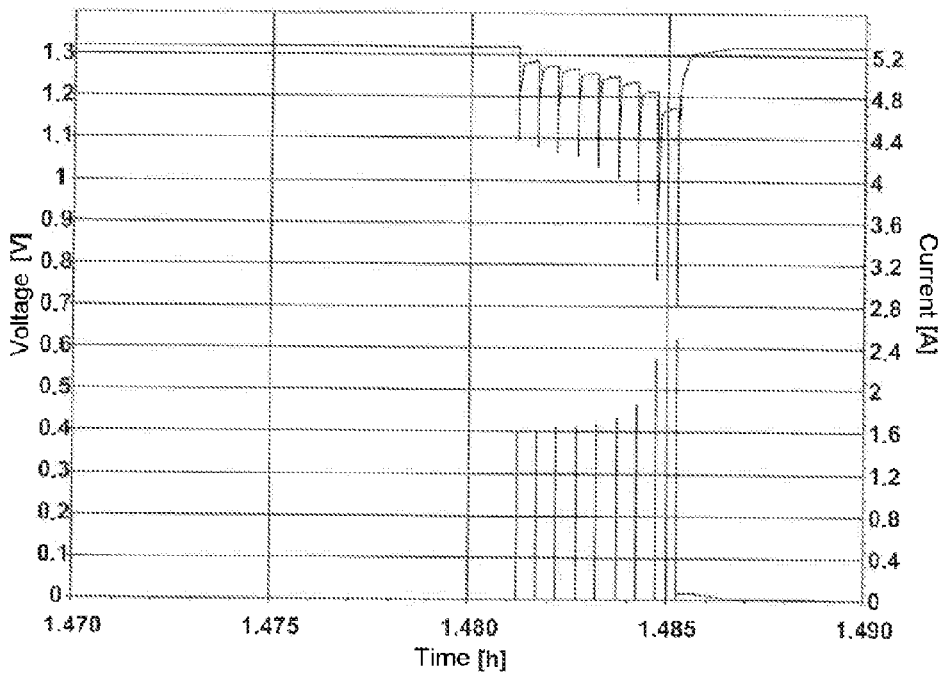
Figure 2E:
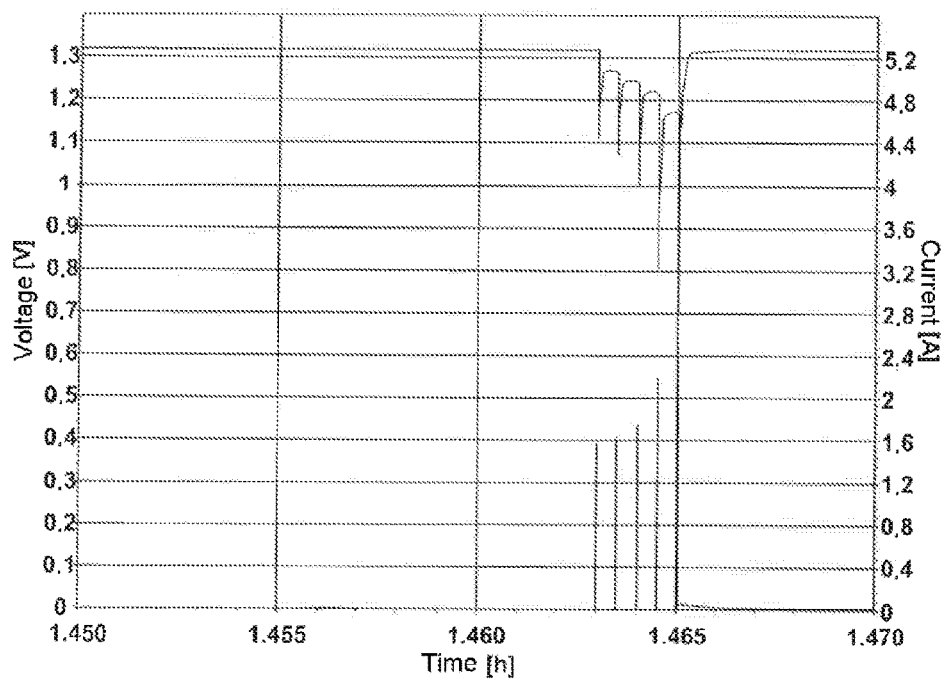

The high pulsed-current loading capacity of an emergency system can be seen from FIGS. 2A to 2E. In each case, discharge curves of a single-cell nickel-metal hydride battery are illustrated, the battery having been kept at a voltage of 1.32 V at various temperatures by a charging electronics system:

FIG. 2A: nickel-metal hydride at 20° C. (50 mA/1.320 V) discharge via 7/4 W-15 s pulses at intervals of 30 min
FIG. 2B: nickel-metal hydride at 45° C. (50 mA/1.320 V) discharge via 7/4 W-15 s pulses at intervals of 30 min
FIG. 2C: nickel-metal hydride at 60° C. (50 mA/1.320 V) discharge via 7/4 W-15 s pulses at intervals of 30 min
FIG. 2D: nickel-metal hydride at 70° C. (50 mA/1.320 V) discharge via 7/4 W-15 s pulses at intervals of 30 min
FIG. 2E: nickel-metal hydride at 80° C. (50 mA/1.320 V) discharge via 7/4 W-15 s pulses at intervals of 30 min.

The invention claimed is:

1. An emergency system for power failures comprising a single-cell or multiple-cell rechargeable battery selected from the group consisting of NiMH, NiCd, NiZn, $Ag_2O/Zn$ or lithium-ion, and a charging electronics system that charges said battery, wherein the charging electronics system is configured to provide a charging voltage at which the battery does not overcharge at a temperature of −10° C. to 85° C. and which transfers the battery into a charging state in which said battery is charged to 5% to 30% of its nominal capacity and, when this capacity is reached, to end the charging process or to continue the aforementioned charging process only to compensate self-discharge of the battery.

2. A printed circuit board for a data-processing device comprising the emergency system as claimed in claim 1.

3. An emergency system for power failures comprising a single-cell or multiple-cell rechargeable battery selected from the group consisting of NiMH, NiCd, NiZn, $Ag_2O/Zn$ or lithium-ion, and a charging electronics system that charges said battery, wherein the charging electronics system is configured to provide a charging voltage at which the battery does not overcharge at a temperature of −10° C. to 85° C. and which transfers the battery into a charging state in which said battery is charged to 5% to 30% of its nominal capacity at 20±2° C. and, when this capacity is reached, to end the charging process or to continue the aforementioned charging process only to compensate self-discharge of the battery.

4. The emergency system as claimed in claim 3, wherein the charging electronics system transfers the battery is kept into a charging state in which said battery is charged to 10% to 20% of its nominal capacity at 20±2° C.

5. The emergency system as claimed in claim 3, wherein the battery is an NiMH battery and the charging voltage per cell is 1.325 V±5 mV.

6. The emergency system as claimed in claim 3, wherein the battery is an NiCd battery and the charging voltage per cell is 1.335 V±5 mV.

7. The emergency system as claimed in claim 3, wherein the battery is an NiZn battery and the charging voltage per cell is 1.900 V±50 mV.

8. The emergency system as claimed in claim 3, wherein the battery is an $Ag_2O/Zn$ battery and the charging voltage per cell is 1.605 V±5 mV.

9. The emergency system as claimed in claim 3, wherein the battery is a lithium-ion battery with $LiCoO_2$ as active material and the charging voltage per cell is 1.875 V±25 mV.

10. The emergency system as claimed in claim 3, wherein the battery and the charging circuit are arranged in a common housing, and electrical contacts are provided for the charging circuit to make contact with an external voltage source and for the battery to make contact with a device on the housing which is to be supplied with emergency power.

11. A printed circuit board for a data-processing device comprising the emergency system as claimed in claim 3.

12. A method of operating a data-processing device which has an emergency system comprising a single-cell or multiple-cell rechargeable battery selected from the group consisting of NiMH, NiCd, NiZn, $Ag_2O/Zn$ or lithium-ion, and a charging electronics system that charges said battery, comprising keeping the battery 1) in a charging state by the charging electronics system in which charging state the battery does not overcharge at a temperature of −10° C. to 85° C. and 2) at 5% to 30% of its nominal capacity and, when this capacity is reached, to end the charging process or to continue the aforementioned charging process only to compensate self-discharge of the battery.

13. The method as claimed in claim 12, wherein the charging electronics systems keeps the battery at a charging state of 10% to 20% of its nominal capacity at 20±2° C.

* * * * *